July 12, 1966  D. A. RUSH  3,260,117
ELECTRIC POSITION DETECTION DEVICES
Filed March 2, 1964  2 Sheets-Sheet 1

INVENTOR:
  DEREK ANTHONY RUSH

ATTORNEYS:
  Moore, Hall + Pollock

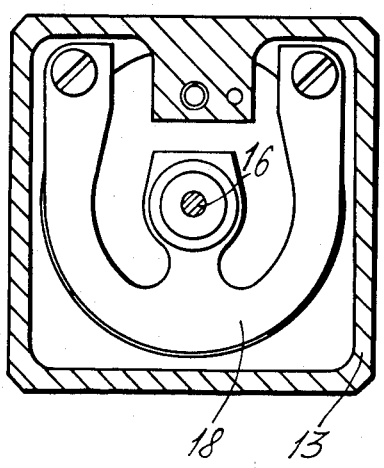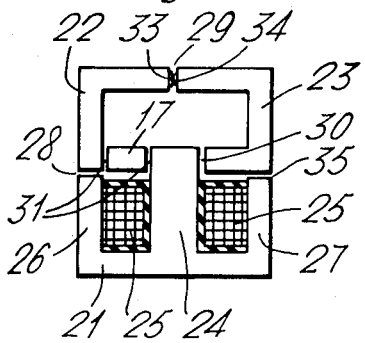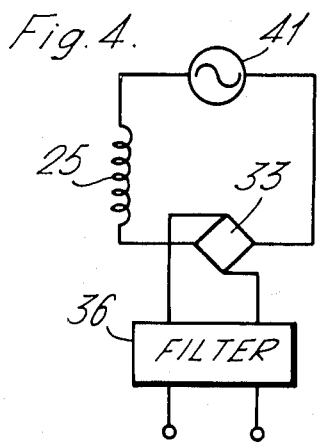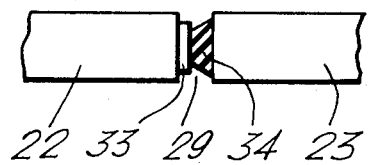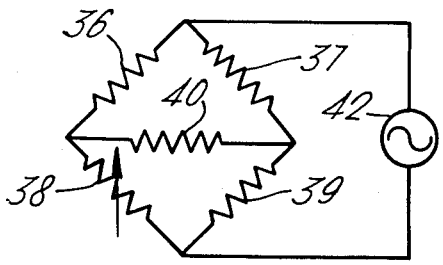

United States Patent Office 3,260,117
Patented July 12, 1966

3,260,117
ELECTRIC POSITION DETECTION DEVICES
Derek Anthony Rush, Stroud, England, assignor to S. Smith & Sons (England) Limited, Cricklewood, London, England, a British company
Filed Mar. 2, 1964, Ser. No. 348,353
Claims priority, application Great Britain, Mar. 4, 1963, 8,563/63
7 Claims. (Cl. 73—398)

This invention relates to electric position detection devices, that is to say devices which produce an electric signal in dependence on the position of a member.

According to one aspect of this invention, an electric position detection device comprises pieces of a high permeability magnetic material arranged so as to form a magnetic circuit closed except for at least one gap, a winding associated with the said circuit to produce a magnetic flux therein upon the passage of an electric current through the winding, a further piece of high permeability magnetic material attached to the said member and so situated in relation to a gap of the said circuit as to produce a variation in the said flux in accordance with a variation of the position of the said member, a Hall effect device disposed in a gap in the said circuit so as to be affected by variations in the said flux, the Hall effect device and the winding being, in operation, connected to the same or separate alternating voltage sources so that currents flow through the Hall effect device and the winding respectively which have a common alternating current component whereby a component of the Hall voltage of the Hall effect device is a direct voltage which has a magnitude dependent on the position of the said member.

A Hall effect device is to be understood to mean a device which includes an element which is arranged to utilise the Hall effect, namely, that if a magnetic field is applied to the element in a first direction and an electric current is passed through the element in a second direction at right angles to the first, then a voltage will appear across the element in a third direction at right angles to the first and second directions, this voltage being referred to as the "Hall voltage."

Preferably, the winding and the Hall effect device are connected in series and are, in operation, connected in series with an alternating voltage source.

Preferably, the said circuit has at least two gaps and the further piece of high permeability magnetic material is associated with one of the gaps and the Hall effect device is disposed within another gap.

The Hall voltage appearing across the element in a Hall-effect device is given by the equation:

$$V = KIB \text{ volts}$$

where:

V is the Hall voltage.
K is a constant dependent on the Hall constant of the material of the element, the geometry of the element, and the thickness of the element in the third direction.
I is the instantaneous current in the second direction.
B is the instantaneous flux density in the first direction.

The flux density B will be dependent on the current flowing through the winding which will be equal to or have a component equal to the current flowing through the Hall effect device in the apparatus defined.

The Hall voltage is therefore given by the equation:

$$V = KI \times CI$$

Where C is a parameter dependent on the position of the said member.

In the apparatus defined the current is alternating so that $I = \sin wt$.

Now $$V = KCi^2$$
$$= KC(i \sin wt)^2$$
$$= KCi^2 \sin^2 wt$$
$$= \frac{KCi^2 (1 - \cos 2wt)}{2}$$
$$= \frac{KCi^2}{2} - \frac{KCi^2 \cos 2wt}{2}$$

The first term is a direct voltage and the second term is an alternating voltage at twice the frequency of the voltage source.

Preferably, therefore, the position detection device also comprises a low pass filter connected to the Hall effect device so that the Hall voltage is applied to it and adapted to attenuate voltages at twice the frequency of the alternating voltage source.

In a convenient arrangement, the position detection device comprises first, second and third fixed pieces of a high permeability magnetic material, the pieces being disposed so that there are first and second gaps between a first part of the first piece and the second and third pieces respectively, third and fourth gaps between a second part of the first piece and the second and third pieces, a fifth gap between the second and third pieces, the piece attached to the said member is disposed in the third gap, the winding encircles the first piece between the first and second parts thereof, and the Hall effect device is disposed in the fifth gap, the reluctance of the first gap being equal to the reluctance of the second gap, the reluctance of the third gap being dependent on the position of the said member and being equal to the reluctance of the fourth gap in a datum position of the said member, whereby in operation, the direction and magnitude of the magnetic flux through the fifth gap is dependent on the position of the said member.

According to another aspect of this invention a pressure difference detector comprises a chamber, an expansible and contractible housing disposed within the chamber, a member connected to the housing so that as the housing expands or contracts the member moves, and an electric position detection device as has been set forth adapted to produce an electric signal in dependence, on the position of the member whereby, in operation, if the chamber is filled with a fluid at a first pressure and the housing is filled with a fluid at a second pressure, the position detection device produces an electric signal in dependence on the difference between the first and second pressures.

A pressure difference detector incorporating an electric position detection device in accordance with this invention will now be described with reference to the accompanying drawings of which:

FIGURE 2 is a scrap view along the line II—II in FIGURE 1.

FIGURE 3 shows the magnetic circuit of the position detection device.

FIGURE 3(a) shows a detail of the magnetic circuit.

FIGURE 4 shows the electrical circuit of the position detection device.

FIGURE 5 shows an electrical circuit analogous to the magnetic circuit shown in FIGURE 3.

Figure 1:
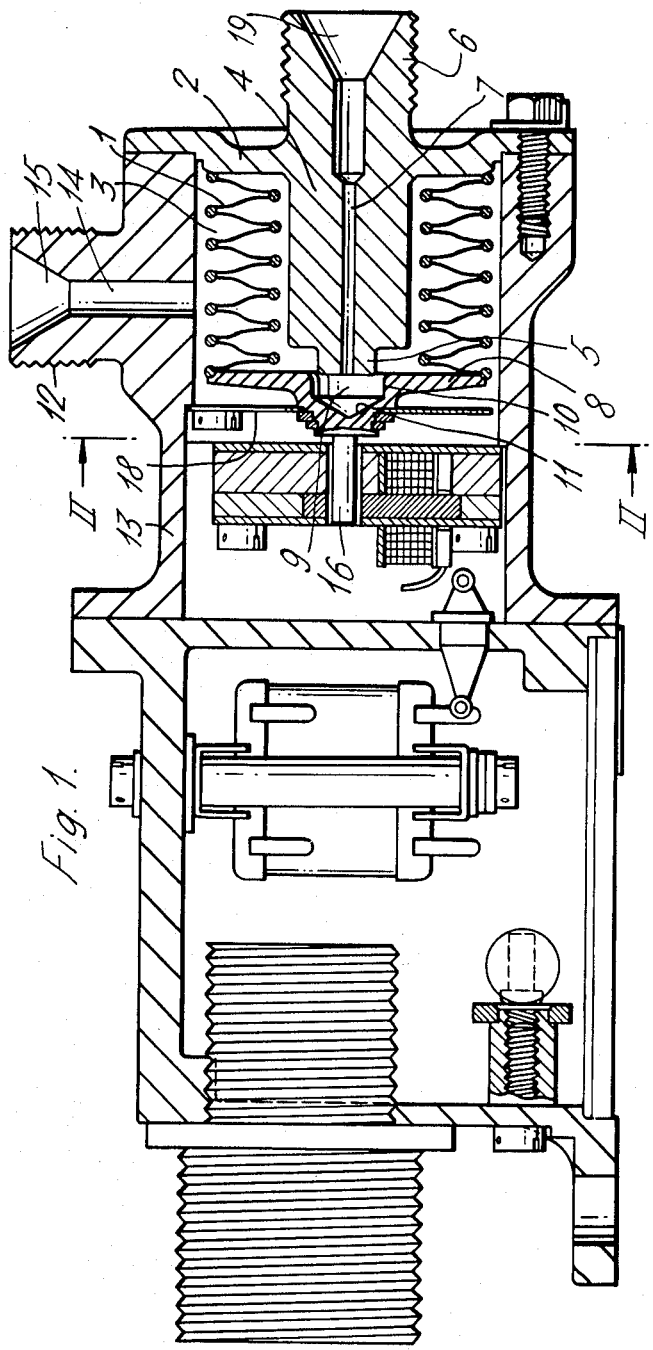
FIGURE 1 is a sectional view of the pressure difference detector.

Referring to FIGURE 1 cylindrical bellows 1 are attached at one end to a member 8 and at the other end to an end plate 2. The plate 2 defines with a casing 13 a cylindrical chamber 3 in which the bellows 1 are disposed. A cylindrical member 4 coaxial with the chamber 3 and integral with the plate 2 extends through the plane of the plate 2 projecting in one direction into the bellows 1 terminating in a portion 5 of reduced diameter and projecting in the other direction outside the chamber 3 terminating in an externally threaded portion 6. A bore 7 is drilled through the member 4 along its axis terminating in a bore 19 of increasing diameter at the external end of the portion 6. The member 8 has a depression 9 which has a cylindrical part 10 which fits over the portion 5 and a cone shaped part 11. When the bellows 1 are fully expanded, fluid can still enter the inside of the bellows 1 through bore 7, the cone shaped part 11 and the cylindrical part 10 outside the portion 5.

An externally threaded coupling part 12 projects from the casing 13 and has a bore 14 terminating in a bore 15 of increasing diameter at the external end of the part 12. A rod 16 (constituting the said member) is fixed to the member 8 and carries at one end a piece 17. Piece 17 is not indicated in FIGURE 1. The member 8 is fixed to a shaped spring 18 (FIGURE 2) which is attached to the casing 13, and serves to hold the member 8 in position.

It is arranged that when the pressure of the fluid outside the bellows 1 exceeds that of the fluid inside it, the bellows are compressed and the rod 16 and the piece 17 are moved. If, however, the pressure of the fluid inside the bellows 1 exceeds that of the fluid outside it the bellows 1 are prevented from expanding and the rod 16 and the piece 17 do not move. When in use, the bellows 1 contracts the spring 18 and allows the rod 16 to move along the axis of the bellows 1.

Referring now to FIGURE 3 the position detection device has three fixed pieces 21, 22 and 23 (constituting the said first, second and third pieces respectively), and the movable piece 17 all of which are constructed from a high permeability magnetic material such as that sold under the trade name "Permendur." The piece 21 is an E core which has upper and lower limbs 26 and 27 and a slightly extended central limb 24 which is surrounded by a coil 25. The piece 22 has an L shape and has one end disposed adjacent to the end of the limb 26 with a gap 28 (constituting the said first gap) between them. The other end of the piece 22 is disposed adjacent to one end of the piece 23 with the gap 29 (constituting the said fifth gap) between them. The piece 23 has a U shape and its other end is disposed adjacent to the limb 24 with a gap 30 (constituting the said fourth gap) between them. The piece 23 is also adjacent to the limb 27 with a gap 35 (constituting the said second gap) between them. The piece 17 is disposed in a gap 31 (constituting the said third gap) between the limb 24 and the piece 22. A "Hall" effect crystal 33 (constituting the said element) is disposed in the gap 29 adjacent to the piece 22 and a paste 34 containing a mixture of an epoxy resin cement (such as that sold under the name "Araldite") and particles of ferrite connects the crystal 33 to the piece 23 (see FIGURE 3(a)). The crystal 33 is constructed in accordance with our British Patent No. 892,457. The reluctances of the gaps 28 and 35 are equal and the reluctance of the gap 31 in the datum position of the piece 17 is equal to that of the gap 30.

Referring now to FIGURE 4, the coil 25 is connected in series with the crystal 33 across an alternating voltage source 41, which may conveniently have a frequency of 400 c./s. A filter 36 is connected across the electrodes on the crystal 33 across which the "Hall voltage" appears. The filter 36 is a low pass filter and is arranged to have a high attenuation at the frequency of, and at twice that of the frequency of the source 41.

Referring now to FIGURE 5, the magnetomotive force generated by the coil 25 in limb 24 is represented by the A.C. generator 42. A resistor 36 (having a resistance R1) represents the reluctance of the gap 35 and a resistor 37 (having a resistance R2) represents that of the gap 28. A variable resistor 38 (having a resistance R3) represents the reluctance of the gap 31 and a resistor 39 (having a resistance R4) represents that of the gap 30. The reluctance of the gap 29 when the crystal and the paste 34 are disposed in it, is represented by the resistor 40. It will be appreciated that if in the circuit shown in FIGURE 5, $R1=R2$ and $R3=R4$, no current flows through the resistor 40. Similarly, in the datum position of the piece 17, there is no magnetomotive force appearing across the crystal 33 so that there is no "Hall voltage."

The operation of the position detection device is as follows. If the piece 17 moves a magnetic flux flows through the gap 29. A Hall voltage then appears across the crystal 33 and the magnitude of the Hall voltage is dependent on the magnitude of the magnetic flux. The Hall voltage has a D.C. component and an A.C. component which is substantially eliminated by the filter 36, so that the D.C. component alone appears across the output terminals of the filter 36.

The piece 17 may be shaped so that the relationship between the output signal and the movement of the piece 17 follows any desired mathematical law.

The operation of the pressure difference detector is as follows. A fluid is introduced into the chamber 3 through the bore 14 and a further fluid is introduced into bellows 1 through the bore 7.

It is arranged that if the pressures are equal the piece 17 is in its datum position so that the reluctances of the gaps 31 and 30 are equal and no voltage appears across the output terminals of the filter 36. If, however, the fluid inside the chamber 3 is at a greater pressure than that of the fluid inside the bellows 1, the rod 16 and the piece 17 are moved and a D.C. voltage appears across the output terminals of the filter 36. The magnitude of the voltage depends on the pressure difference.

The position detection device described has the advantage that if the device is spoiled for some reason, the magnitude of the output signal will be reduced but its polarity will not normally be reversed.

I claim:

1. An electric position detection device for producing an electric signal in dependence on the position of a movable member, comprising a plurality of pieces of a high permeability magnetic material arranged to form a magnetic circuit closed except for a plurality of gaps, a winding wound on one of the pieces so that magnetic flux passes through the pieces and the gaps upon the passage of an electric current through the winding, a further piece of high permeability magnetic material carried by said movable member and disposed in one of the gaps so that the flux varies on movement of said movable member, a Hall effect device having input terminals and output terminals disposed in another of said gaps, the winding and the input terminals of the Hall effect device being connected to alternating voltage source means such that currents flow through the winding and the Hall effect device which have a common alternating current component.

2. An electric position detection device as claimed in claim 1 wherein the input terminals of the Hall effect device and the winding are connected in series.

3. An electric position detection device as claimed in claim 1 which comprises an electric filter connected across the output terminals of the Hall effect device and constructed to attenuate voltages at twice the frequency of the alternating voltage source means.

4. An electric position detection device as claimed in claim 1 which comprises a substance containing particles of a magnetisable material, said another of said gaps having first and second faces and said substance being disposed in said another of said gaps between the Hall effect device and at least one of said first and second faces.

5. An electric position detection device as claimed in claim 4 wherein the Hall effect device is held in contact with said first face by said substance.

6. An electric position detection device for producing an electric signal in dependence on the position of a movable member comprising first, second, third and fourth pieces of a high permeability magnetic material, said first piece having first and second parts, said first, second and third pieces being fixed and being disposed so that there are first and second gaps between said first part and said second and third pieces respectively, third and fourth gaps between said second part and said second and third pieces respectively, and a fifth gap between said second and third pieces, said fourth piece being carried by said movable member and being disposed in said third gap, a winding wound on said first piece between said first and second parts, and a Hall effect device having input and output terminals disposed in said fifth gap, the reluctance of the first gap being equal to the reluctance of the second gap, the reluctance of the third gap being dependent on the position of said movable member and being equal to the reluctance of the fourth gap in a datum position of said movable member, said winding and said input terminals being connected to alternating voltage source means such that currents flow through said winding and said Hall effect device which have a common alternating current component.

7. A pressure difference detector comprising a chamber, an expansible and contractible housing disposed within the chamber, said chamber being provided with first inlet means for introducing a fluid into the housing and second inlet means for introducing a fluid into the space in the chamber outside the housing, a member connected to the housing so that as the housing expands and contracts the member moves, a plurality of pieces of a high permeability magnetic material arranged to form a magnetic circuit closed except for a plurality of gaps, a winding wound on one of the pieces so that magnetic flux passes through the pieces and the gaps when an electric current passes through the winding, a further piece of a high permeability magnetic material carried by said member and disposed in one of the gaps so that said magnetic flux changes on expansion and contraction of said housing, a Hall effect device having input terminals and output terminals disposed in another of said gaps, the input terminals and the winding being connected to an alternating voltage source such that currents flow through the Hall effect device and the winding which have a common alternating current component.

References Cited by the Examiner

UNITED STATES PATENTS

| | | | |
|---|---|---|---|
| 2,987,669 | 5/1961 | Kallman | 324—45 |
| 3,060,370 | 10/1962 | Varter Asian. | |
| 3,118,108 | 1/1964 | Zoss et al. | 73—398 X |

LOUIS R. PRINCE, *Primary Examiner.*